(12) United States Patent
Hara et al.

(10) Patent No.: US 6,230,900 B1
(45) Date of Patent: *May 15, 2001

(54) FILTER ASSEMBLY AND PROCESS FOR PRODUCING THE SAME

(75) Inventors: Toshimi Hara; Hiroshi Morikawa; Keiichi Katagiri, all of Hamakita (JP)

(73) Assignee: Toyo Roki Seizo Kabushiki Kaisha, Shizuoka-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,695

(22) Filed: Sep. 2, 1997

(30) Foreign Application Priority Data

Feb. 24, 1997 (JP) .................................................. 9-039202

(51) Int. Cl.⁷ .................................................... B01D 27/08
(52) U.S. Cl. ............................ 210/443; 210/450; 29/505; 29/509; 29/525; 29/888.3
(58) Field of Search ..................................... 210/440, 443, 210/444, DIG. 17, 450; 29/505, 509, 525, 888.3

(56) References Cited

U.S. PATENT DOCUMENTS

| | | | |
|---|---|---|---|
| 3,305,095 | * 2/1967 | Hathaway | 210/440 |
| 3,473,664 | * 10/1969 | Hultgren | 210/443 |
| 3,490,597 | * 1/1970 | Casaleggi | 210/443 |
| 3,529,721 | * 9/1970 | Papp | 210/443 |
| 3,685,658 | * 8/1972 | Baldwin | 210/440 |
| 4,237,015 | * 12/1980 | Fearnhead | 210/DIG. 17 |
| 4,855,047 | * 8/1989 | Firth | 210/DIG. 17 |

* cited by examiner

Primary Examiner—Matthew O. Savage
(74) Attorney, Agent, or Firm—Young & Thompson

(57) ABSTRACT

A filter assembly comprises a filter case having an opening end portion; a filter element inserted into the filter case; a set plate mounted to the opening end portion of the filter case and having an inlet and an outlet of fluid to be filtered; and a seal plate attached to the set plate and fixed to the opening end portion of the filter case by curling up an outer periphery portion thereof together with an edge portion of the opening end portion of the filter case. The set plate is mounted to the filter case with press fitting to ensure the mechanical contact to prevent the leakage of the fluid to be filtered. Thus, the filer assembly can effectively prevent leakage of fluid of high pressure, such as AT-fluid introduced therein.

7 Claims, 5 Drawing Sheets

FILTER ASSEMBLY AND PROCESS FOR PRODUCING THE SAME

BACKGROUND OF THE INVENTION

This invention relates to a filter assembly for filtering fluid, such as working fluid for an automatic transmission of an automobile and to a process for producing the filter assembly.

For filtering engine lubricating oil of an automobile, a filter assembly, in which a filter element is housed in a cylindrical filter case and the filter case is detachably attached to an exterior of an engine block of the automobile, has been typically used. On the other hand, a filter assembly for filtering the working fluid of the automatic transmission of the automobile (herein after called AT-fluid) is normally housed in an interior of a mission case because of limitations with respect to layout in the engine room of the automobile.

However, it has recently tried to detachably attach the filter assembly for the AT-fluid to the exterior of the mission case in order to facilitate maintenance or replacement as in the case of the filter assembly for the engine lubricating oil. In this case, since the pressure of the fluid to be filtered is relatively higher than that of the engine lubricating oil, e.g. the former is twice or three times as much as the later, and pressure fluctuation frequently occurs in the filter assembly, it is necessary to take particular measures to prevent leakage of the fluid in the filter assembly.

SUMMARY OF THE INVENTION

Therefore, one of the objects of the present invention is to provide a filter assembly capable of preventing leakage of fluid through a portion between an outer periphery of a set plate and an inner surface of a filter case, even if the fluid of high pressure, such as the AT-fluid, is introduced therein.

In order to obtain the above object, a filter assembly of the present invention comprises a filter case having an opening end portion; a filter element inserted into the filter case; a set plate mounted to the opening end portion of the filter case with press fitting and having an inlet and an outlet of fluid to be filtered; and a seal plate attached to the set plate and fixed to the opening end portion of the filter case by curling up an outer periphery portion thereof together with an edge portion of the opening end portion of the filter case.

According to the above filter assembly, since the set plate and the filter case tightly contact each other, it is possible to improve the sealing effect by the mechanical contact between the set plate and the filter case. Therefore, it is possible to provide the highly reliable filter assembly capable of preventing the leakage of the fluid through the outer periphery of the set plate, even if the fluid of high pressure, such as AT-fluid, is introduced into the filter case and the pressure fluctuation frequently occurs in the filter assembly.

In the above filter assembly, the filter case can comprise an outwardly expanded portion at the opening end portion thereof, and the set plate can be fitted into an inner surface of the expanded portion. Also, the filter case can be inwardly squeezed between the expanded portion and the edge portion thereof. These configurations allow the mechanical contact between the set plate and the filter case to be more tight to thereby ensure the sealing effect between them. Further, a sealant may be provided at a portion in which the filter case and the set plate contact each other to form a double seal for ensuring the sealing effect between the filter case and the set plate.

Another object of the present invention is to provide a filter assembly capable of preventing leakage of fluid through a portion at which a seal plate and a set plate contact each other.

In order to obtain the above object, a filter assembly of the present invention comprises a filter case having an opening end portion; a filter element inserted into the filter case; a set plate mounted to the opening end portion of the filter case and having an inlet and an outlet of fluid to be filtered; and a seal plate provided with an circular groove to hold an gasket, the seal plate being attached to the set plate at a position inwardly apart from the groove and being fixed to the opening end portion of the filter case by curling up an outer periphery portion outwardly apart from the groove thereof together with an edge portion of the opening end portion of the filter case.

According to the above filter assembly, since the seal plate is attached to the set plate at the position inwardly apart from the circular groove, it is possible to reduce dimensional errors of a gap between the seal plate and the set plate at a position behind the circular groove without influence of unevenness of a process for attaching the seal plate to the set plate, such as spot-welding. Therefore, it is possible to certainly seal up the gap and to thereby prevent the leakage of the fluid from the curling portion of the seal plate and the filter case through the gap between the seal plate and the set plate.

In the above filter assembly, a portion between the set plate and a surface of the seal plate behind the groove may be filled up with a sealant to ensure the sealing effect between the set plate and the seal plate.

Still another object of the present invention is to provide a filter assembly capable of preventing leakage of fluid through a portion at which a seal plate and a set plate contact each other.

In order to obtain the above object, a filter assembly of the present invention comprises a filter case having an opening end portion; a filter element inserted into the filter case; a set plate mounted to the opening end portion of the filter case and having an inlet and an outlet of fluid to be filtered; and a seal plate attached to the set plate and fixed to the opening end portion of the filter case by curling up an outer periphery portion thereof together with an edge portion of the opening end portion of the filter case; wherein a portion, in which the filter case and the set plate contact each other, is formed so as to be sealed irrespective of dimensional errors thereof.

Further object of the present invention is to provide a process for producing a filter assembly capable of preventing leakage of fluid through a portion at which a seal plate and a set plate contact each other.

In order to obtain the above object, a process for producing a filter assembly of the present invention comprises the steps of inserting a filter element into a filter case; attaching a set plate which has an inlet and an outlet of fluid to be filtered to an opening end portion of the filter case equipped with the filter element; and fixing an outer periphery portion of a seal plate attached to the set plate by curling up the outer periphery portion together with an edge portion of the opening end portion of the filter case; wherein a portion, in which the filter case and the set plate contact each other, is sealed irrespective of dimensional errors thereof in the step of attaching the set plate.

According to the above filter assembly and the process for producing the filter assembly, since a gap between the filter case and the outer periphery of the set plate is sealed irrespective of dimensional errors thereof, it is possible to ensure the sealing effect between the set plate and the filter case. Therefore, it is possible to provide the highly reliable filter assembly capable of preventing the leakage of the fluid through the outer periphery of the set plate, even if the fluid of high pressure, such as AT-fluid, is introduced into the filter case and the pressure fluctuation frequently occurs in the filter assembly.

Still further objects, features and other aspect of the present invention will be understood from the following detailed description of the preferred embodiments of the present invention with reference to the accompanying drawings.

DESCRIPTION OF THE PREFERRED EMBODIMENTS

Figure 1:
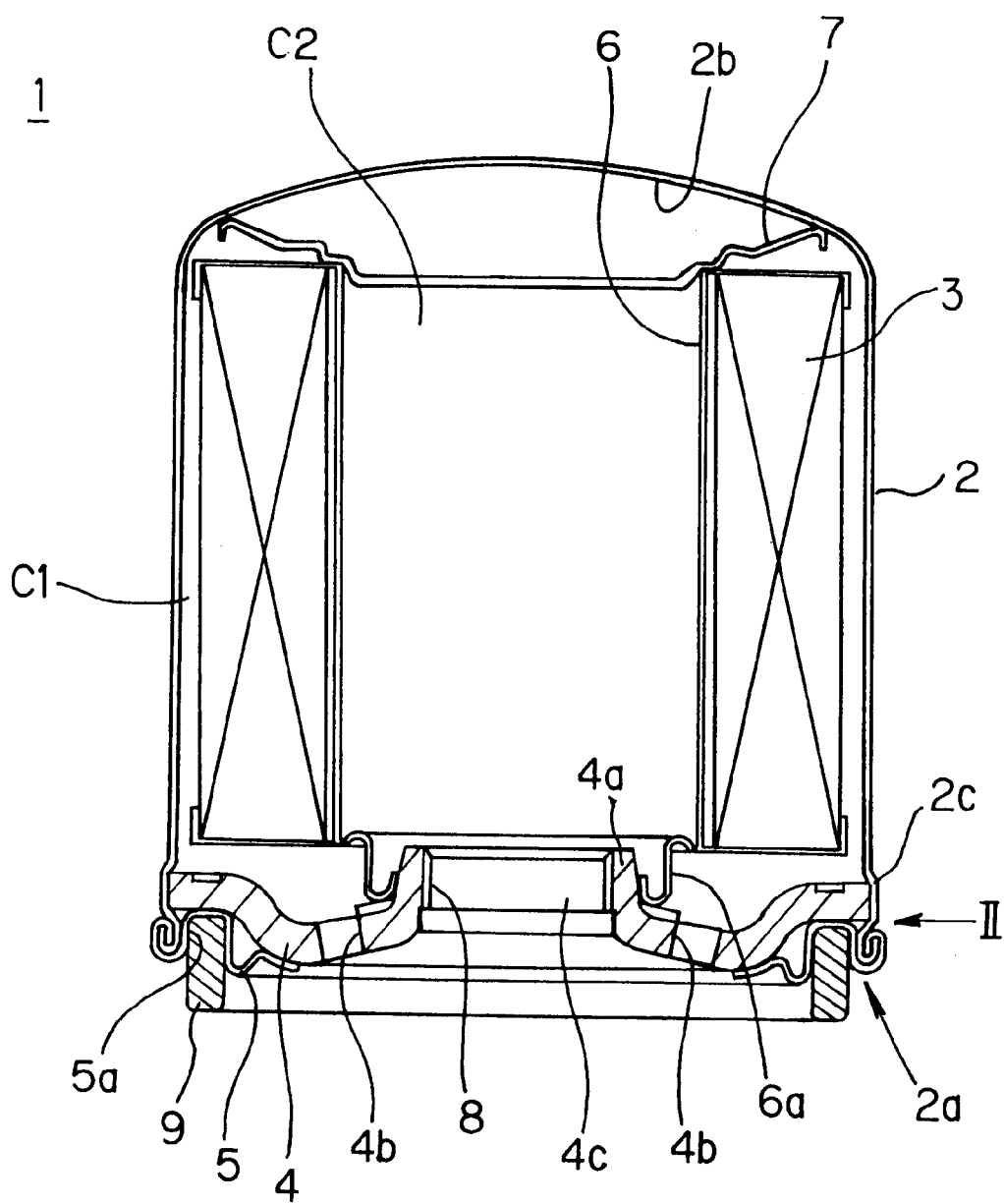
FIG. 1 is a vertical-sectional view of a filter assembly for AT-fluid in accordance with one embodiment of the present invention.

Referring to FIG. 1, a filter assembly 1 of this embodiment comprises a filter case 2, a filter element 3 inserted into the filter case 2, a set plate 4 having a disk shape and mounted to an opening end portion 2a of the filter case 2, and a seal plate 5 having a ring shape and coupled to the set plate 4.

The filter case 2 is formed in a thin (e.g. less than 1 mm) and hollow cylindrical form from a steel plate or tube material. The filter element 3 is formed in a generally cylindrical shape from a filter material, such as filter paper, sponge or the like, and a support tube 6 is fitted to the inner circumference of the filter element 3. A plate spring 7 contacting an inner bottom surface 2b of the filter case 2 is provided at one end of the support tube 6. A seal cap 6a is provided at the other end of the support tube 6 so as to contact a screw tube 4a located at a center of the set plate 4 by the repelling force of the plate spring 7. Therefore, the filter element 3 is held at the predetermined position in the filter case 2, and thus the inner space of the filter case 2 is divided into a primary chamber C1 into which AT-fluid to be filtered flows and a secondary chamber C2 into which the AT-fluid passed through the filter element 3 from the outside to the inside thereof flows.

At the outer periphery of the screw tube 4a, inlet openings 4b are provided to introduce the AT-fluid to the primary chamber C1 from the outside of the filter assembly 1. At the center portion of the screw tube 4a, an outlet opening 4c is provided to discharge the AT-fluid from the secondary chamber C2, and the inner surface of the outlet opening 4c is formed as a female screw 8 to connect the filter assembly 1 to a companion parts (not shown). The seal plate 5 is fixed to the opening end portion 2a of the filter case 2 by curing up the outer periphery portion thereof together with an edge portion of the opening end portion 2a of the filter case 2. At a position inwardly apart from the curing portion of the seal plate 5 is provided a circular groove 5a to hold a gasket 9 of a ring shape. When the filter assembly 1 is connected to the companion parts through the female screw 8, the companion parts and the gasket 9 tightly contact each other to seal up between them.

Figure 2:
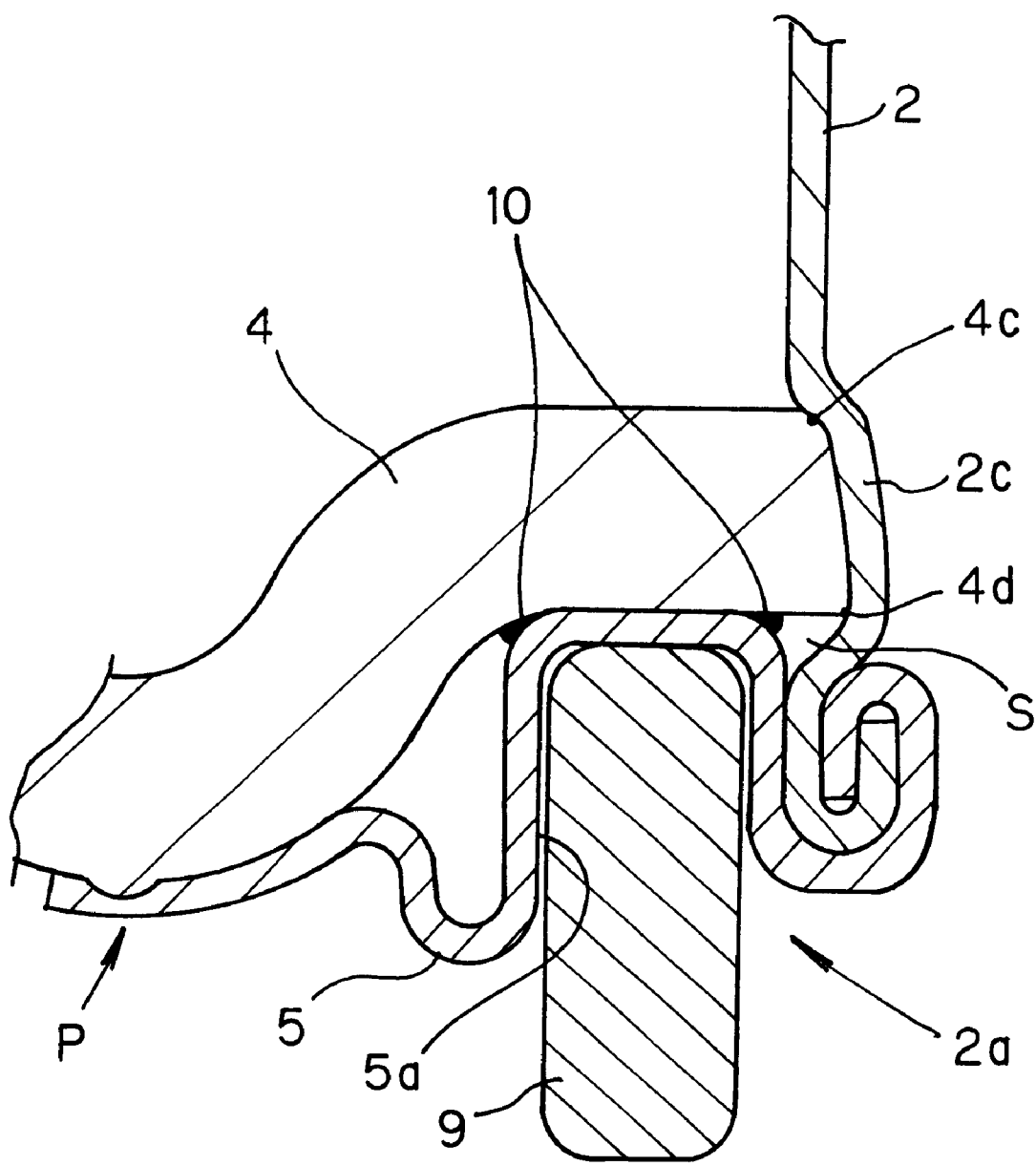
FIG. 2 is an enlarged view of the portion II of FIG. 1.

As is minutely disclosed in FIG. 2, an expanded portion 2c is formed at the opening end portion 2a of the filter case 2. The set plate 4 is mounted to the inside of the expanded portion 2c with press fitting. The set plate 4 and the seal plate 5 are fixed to each other by spot-welding at a position P inwardly apart from the circular groove 5a. Between a back surface of the seal plate 5 behind the circular groove 5a and the set plate 4 is provided a sealant 10 to seal up a minute gap (not shown) between them. The filter case 2 is radially inwardly squeezed at a position apart from the set plate 4 and close to the opening end portion 2a. The set plate 4 is produced by punching a steel plate having a thickness greater than that of the material of the filter case 2 (e.g. approximately 4 mm). The seal plate 5 is produced by punching a steel plate having a thickness substantially equal to that of the material of the filter case 2.

The process for producing the filter assembly 1 is as follows.

Figure 3:
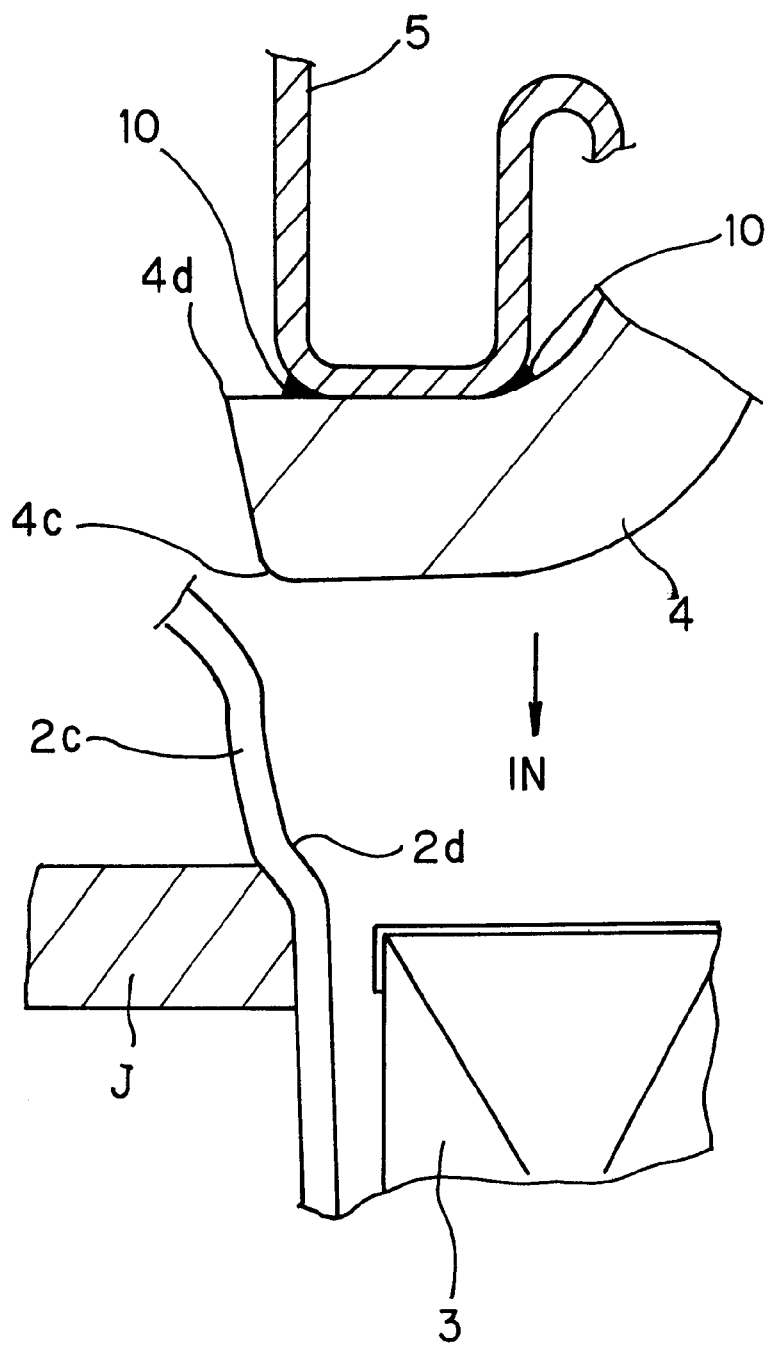
FIG. 3 is an enlarged view showing a process of mounting the set plate to the filter case with press fitting in the filter assembly of FIG. 1.

First, the filter element 3, the support tube 6 and the plate spring 7 are assembled with each other and this subassembly is inserted into the filter case 2. Next, the set plate 4 is mounted to the filter case 2 with press fitting. As partially shown in FIG. 3, in this press fitting step, a jig J for supporting the filter case 2 is applied to the outer circumference of the expanded portion 2c of the filter case 2 from a side opposite to a direction in which the set plate 4 is fitted (indicated by an arrow IN), and in this condition, the set plate 4 is pressingly inserted to the filter case 2 until the one edge 4c thereof contacts a stepped inner surface 2d of the expanded portion 2c to thereby restrict further insertion of the set plate 4. According to this step, the edge 4c and the expanded portion 2c tightly contact each other to improve the sealing effect between the set plate 4 and the expanded portion 2c of the filter case 2.

After the press fitting, the outer periphery of the seal plate 5 and the opening end portion 2a of the filter case 2 are fixed to each other by curing up them. In this curing step, the so-called neck-in process in which the opening end portion 2a of the filter case 2 is radially inwardly squeezed is applied. Therefore, as shown in FIG. 2, the other edge 4d of the set plate 4 tightly contacts the inner surface of the filter case 2, so that the sealing effect is further improved.

Figure 4:
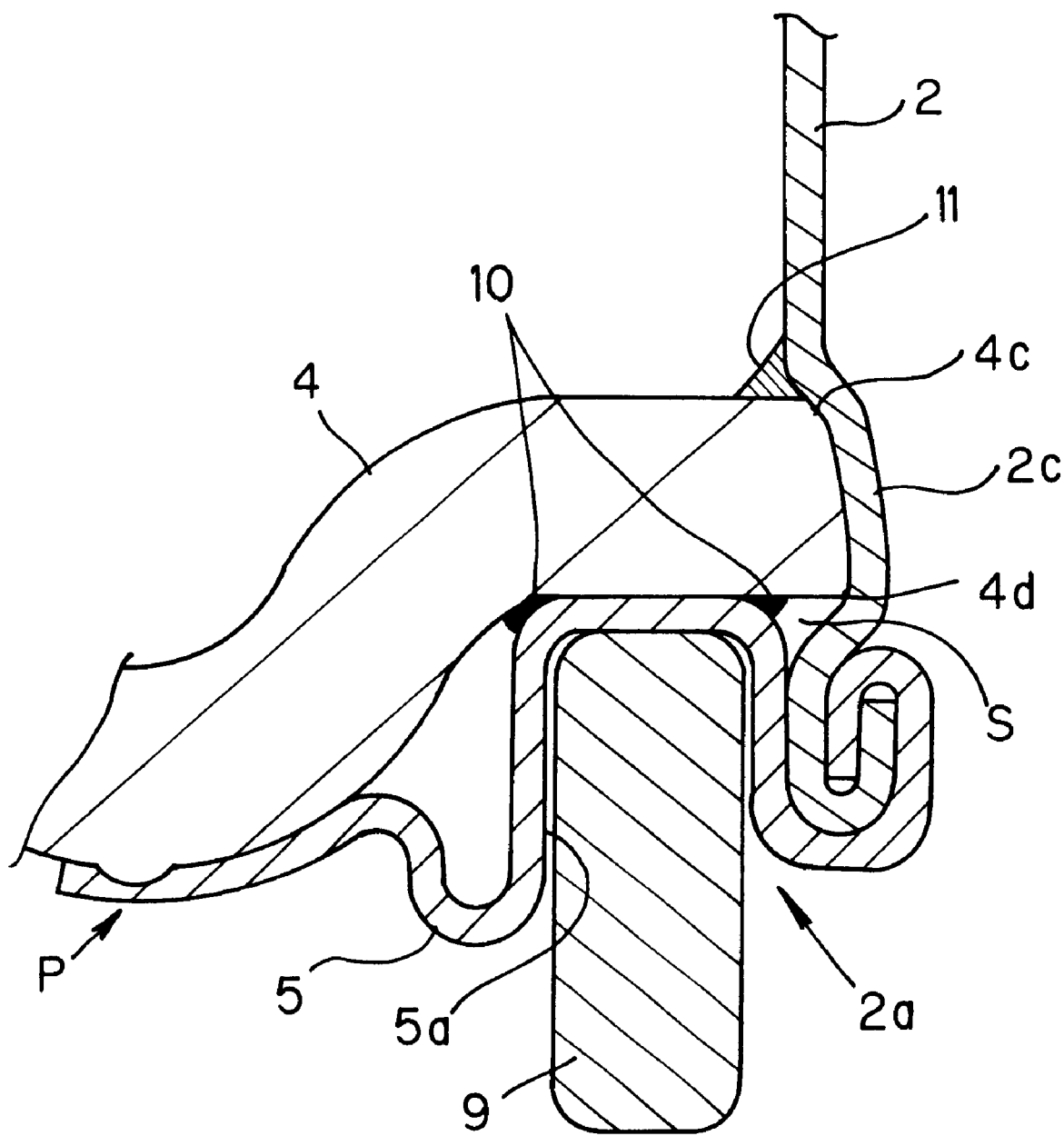
FIG. 4 is an enlarged view showing a modification of the structure of FIG. 2 in which a sealant is applied to a contacting portion between the set plate and the filter case.

The seal plate 5 and the set plate 4 are fixed to each other by spot-welding applied before the press fitting of the set plate 4, and the sealant 10 is applied between the back surface behind the circular groove 5a and the set plate 4 in the spot-welding step. Since the position of the spot-welding is inwardly located from the circular groove 5a, it is possible to reduce dimensional errors of the minute gap between the back surface of the seal plate 5 and the set plate 4 at the position behind the circular groove 5a with eliminating influence of unevenness of spot-welding. Therefore, it is possible to certainly seal up the gap by the sealant 10. As shown in FIG. 4, it may be possible to apply a sealant 11 to the inner surface of the expanded portion 2c in the press fitting step of the set plate 4. In this case, the contacting portion between the edge 4c of the set plate 4 and the filter case 2 is doubly sealed by the mechanical contact between the set plate 4 and the filter case 2 and the overlapped sealant 11, and therefore the sealing effect at the contacting portion between the set plate 4 and the filter case 2 is further improved. It may be possible to use epoxide resin adhesive or the like as the sealant 10 or 11.

According to the above structure, each of the contacting portions between the filter case 2 and the seal plate 5 and between the back surface of the seal plate 5 behind the circular groove 5a and the set plate 4 is certainly sealed. Therefore, there is no possibility of the leakage of the AT-fluid from the assembly 1 through the space S enclosed with the filter case 2, the set plate 4 and the seal plate 5.

Figure 5A:
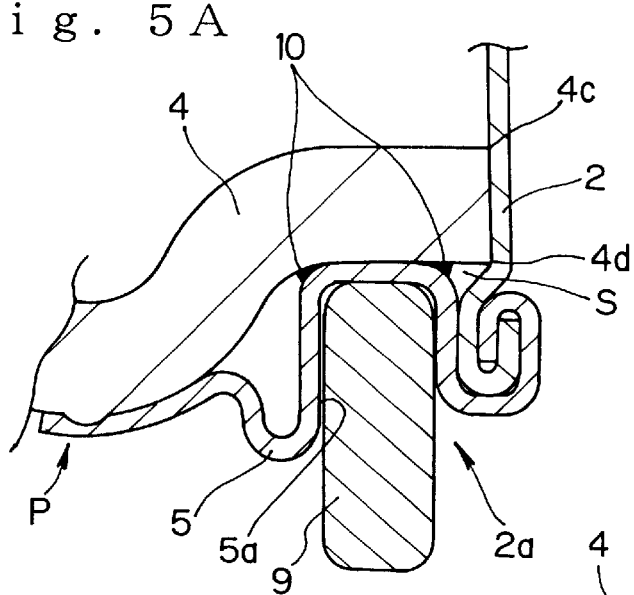
FIGS. 5A, 5B and 5C are enlarged views each showing another embodiment of structure for mounting the set plate to the filter case.
Figure 5B:
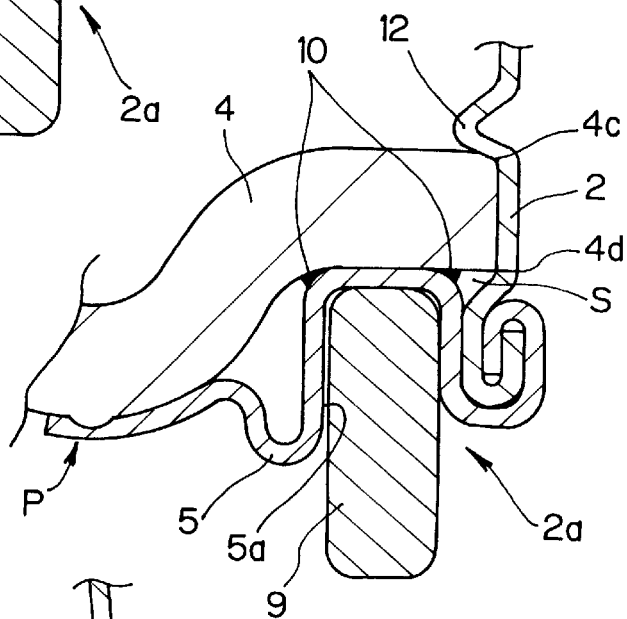
Figure 5C:
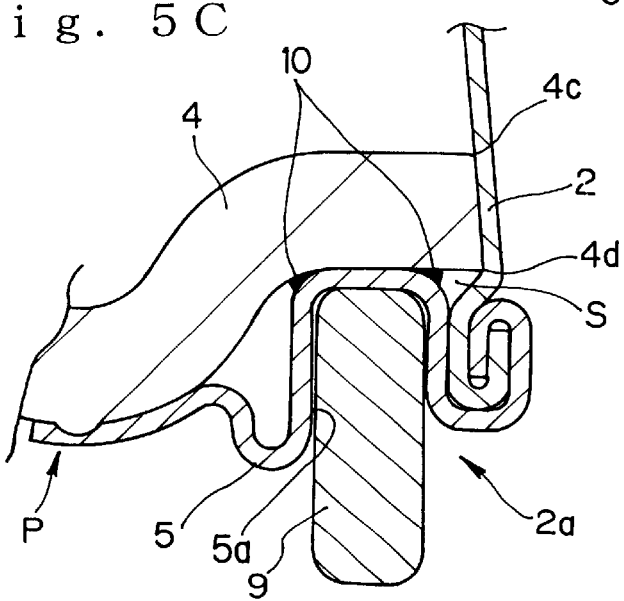

The present invention is not limited to the usage of the filter assembly for the AT-fluid, and can be utilized as a filter assembly for various types of fluid to be filtered. It may be possible to couple the seal plate 5 and the set plate 4 by the other means beside the spot-welding. The space S may be filled up with the sealant 10 or 11 or the like. As shown in FIG. 5A, the set plate 4 may be pressingly inserted into the filter case 2 in which the expanded portion 2c is omitted. As shown in FIG. 5B, a stopper 12 projecting from the inner surface of the filter case 2 may be provided and the set plate 4 can contact the stopper 12. The stopper 12 can be formed by plastically deforming the filter case 2 toward the interior thereof, or by joining a separable member as the stopper onto the interior of the filter case 2. As shown in FIG. 5C, the filter case 2 may be formed in a tapered body gradually expanding as it goes to the opening end portion 2a thereof, and the set plate 4 can be inserted into the tapered inner surface of the filter case 2.

The set plate includes an outer peripheral portion 4d (see FIGS. 1 and 5C) with an interior surface 4e facing an interior of the housing and an exterior surface 4f facing exterior of the housing. The interior and exterior surfaces 4e, 4f of the set plate are generally parallel to each other and extend generally perpendicularly to a central axis 100 of the filter casing (see FIG. 1). The set plate includes a radially outer tapered peripheral surface 4g extending form the interior surface to the exterior surface of the set plate, wherein the radially outer tapered peripheral surface of the set plate enters the opening end portion of the filter case with press fitting against a radially inner peripheral surface 2d of the filter case to improve a sealing effect between the set plate and the filter case. The tapered peripheral surface occupies substantially an entire thickness T of the outer peripheral portion 4d of the set plate as defined by a distance measured from the interior surface 4e to the exterior surface 4f of the set plate, wherein the tapered peripheral surface 4g tapers radially outwardly from the central axis in a direction axially away from the filter element from the interior surface 4e to the exterior surface 4f of the set plate. The seal plate 5 is attached to the exterior surface of the set plate and is fixed to the opening of the filter case 2 by curling up the outer periphery portion 5b together with an edge portion 2e of the opening end portion of the filter case.

What is claimed:

1. A filter assembly for a working fluid of an automatic transmission of an automobile, comprising:

a filter case having an opening end portion coaxially surrounding a central axis of the filter case;

a filter element inserted into the filter case;

a set plate mounted in the opening end portion of the filter case, the set plate having an outer peripheral portion with an interior surface facing an interior of the housing and an exterior surface facing exterior of the housing, wherein the interior and exterior surfaces of the set plate are generally parallel to each other and extend generally perpendicularly to said central axis, wherein said set plate includes a radially outer tapered peripheral surface extending from the interior surface to the exterior surface of the set plate, wherein said radially outer tapered peripheral surface of the set plate enters said opening end portion of the filter case with press fitting against a radially inner peripheral surface of the filter case to improve a sealing effect between the set plate and the filter case, said set plate having an inlet and an outlet for the working fluid to be filtered; and a seal plate attached to the exterior surface of the set plate and fixed to the opening end portion of the filter case by curling up an outer periphery portion thereof together with an edge portion of the opening end portion of the filter case;

wherein said tapered peripheral surface occupies substantially an entire thickness of the outer peripheral portion of the set plate as defined by a distance measured from the interior surface to the exterior surface of the set plate, wherein said tapered peripheral surface tapers radially outwardly from said central axis in a direction axially away from the filter element from the interior surface to the exterior surface of the set plate.

2. A filter assembly of claim 1, wherein the filter case comprises an outwardly expanded portion at the opening end portion thereof, the set plate being fitted into an inner surface of the expanded portion.

3. A filter assembly of claim 2, wherein the filter case is inwardly squeezed between the expanded portion and the edge portion thereof.

4. A filter assembly of claim 1, wherein a sealant is provided at a portion in which the filter case and the set plate contact each other.

5. A filter assembly of claim 1, wherein the seal plate is provided with a circular groove to hold a gasket, and the seal plate is attached to the set plate at a position inwardly apart from the groove.

6. A filter assembly of claim 5, wherein a portion between the set plate and a surface of the seal plate behind the groove is filled up with a sealant.

7. A process for producing a filter assembly for a working fluid of an automatic transmission of an automobile, comprising the steps of:

inserting a filter element into a filter case;

mounting a set plate which has an inlet and an outlet of the working fluid to be filtered in an opening end portion of the filter case, the set plate having an outer peripheral portion with an interior surface facing an interior of the housing and an exterior surface facing exterior of the housing, wherein the interior and exterior surfaces of the set plate are generally parallel to each other and extend generally perpendicularly to said central axis, wherein said set plate includes a radially outer tapered peripheral surface extending from the interior surface to the exterior surface of the set plate, wherein said radially outer tapered peripheral surface of the set plate enters said opening end portion of the filter case with press fitting against a radially inner peripheral surface of the filter case to improve a sealing effect between the set plate and the filter case, wherein said tapered peripheral surface occupies substantially an entire thickness of the outer peripheral portion of the set plate as defined by a distance measured from the interior surface to the exterior surface of the set plate, wherein said tapered peripheral surface tapers radially outwardly from said central axis in a direction axially away from the filter element from the interior surface to the exterior surface of the set plate; and fixing an outer periphery portion of a seal plate attached to the exterior surface of the set plate by curling up the outer periphery portion together with an edge portion of the opening end portion of the filter case.

* * * * *